United States Patent [19]
Stokes et al.

[11] Patent Number: 6,022,408
[45] Date of Patent: Feb. 8, 2000

[54] CEMENT AND CONCRETE COMPOSITIONS FOR CONTROLLING ALKALI-SILICA REACTION IN CONCRETE

[75] Inventors: David B. Stokes, Shelby; Gary E. Foltz, McAdenville; Claudio E. Manissero, Maiden, all of N.C.

[73] Assignee: FMC Corporation, Bessemer City, N.C.

[21] Appl. No.: 09/036,293

[22] Filed: Mar. 6, 1998

Related U.S. Application Data

[62] Division of application No. 08/709,552, Sep. 6, 1996, Pat. No. 5,755,876.
[60] Provisional application No. 60/003,475, Sep. 8, 1995.
[51] Int. Cl.[7] .................................................. C04B 14/04
[52] U.S. Cl. ................... 106/739; 106/738; 106/734; 106/752; 106/768; 106/737; 106/819
[58] Field of Search .................... 106/737, 734, 106/739, 752, 768, 819, 738

[56] References Cited

U.S. PATENT DOCUMENTS

| | | | |
|---|---|---|---|
| 3,331,695 | 7/1967 | Angstadt | 106/819 |
| 4,391,314 | 7/1983 | Takakura et al. | 427/140 |
| 5,656,075 | 8/1997 | Gaidis et al. | 106/737 |

FOREIGN PATENT DOCUMENTS

| | | |
|---|---|---|
| 62-278151 | 3/1987 | Japan . |
| WO 93/12052 | 6/1993 | WIPO . |

OTHER PUBLICATIONS

Sakaguchi et al., "The inhibiting effect of lithium compounds on alkali–silica reaction", 8th international conference on alkali–aggregate reaction, (no month) 1989.
D.B. Stark et al., Lithium Salt Admixtures—An Alternative Method to Prevent Expansive Alkali–Silica Reactivity, Skokie, Il, Portland Cement Assoc. Research and Development Information, Jul. 1992. (no month).
A.I. Safa et al., Cement, Concrete, and Aggregates, vol. 5, No. 1, Summer 1983, pp. 21–25. (no month).
W.J. McCoy and A.G. Caldwell, J. of the Amer. Concrete Institute 22, 693–706 (1951). (no month).
Y. Sakaguichi et al., Proceedings, 8th International Conf., Alkali Aggregate Reaction, Kyoto, Japan: 229–234 (1989). (no month).
D.B. Stark et al., Eliminating or Minimizing Alkali–Silica Reactivity, Washington, D.C., National Research Council, Strategic Highway Research Program, SHRP–C–343, pp. 75–106 (1993). (no month).
J. Gajda, Development of a Cement to Inhibit Alkali–Silica Reactivity, Skokie, Il, Portlan Cement Assoc. Research and Development Bulletin RD115T (1996). (no month).
Chemical Abstracts, vol. 125, No. 20, Nov. 11, 1996 Columbus, Ohio, US; abstract No. 255289, J. Gajda: "Development of a lithium bearing cement to inhibit alkali–silica reactivity in hardened concrete" XP002022911 see abstract & World Cem., vol. 27, No. 8, pp. 58–74.
Chemical Abstracts, vol. 82, No. 12, Mar. 24, 1975, Columbus, Ohio, US; abstract No. 76519q, O. Korab et al., XP002022912 see abstract & Zb. Pr. Chemickotechnol. Fak., 1974, pp. 301–306.
Chemical Abstracts, vol. 121, No. 2, Jul. 11, 1994, Columbus, Ohio, US; abstract No. 16366, S. Diamond et al.: "The mechanisms of lithium effects on ASR" XP002022913 see abstract & 9th International Conference, Alkali–Aggregate Reaction in Concrete, Slough, UK, vol. 1, pp. 269–278.
Chemical Abstracts, vol. 121, No. 2, Jul. 11, 1994, Columbus, Ohio, US; abstract No. 16251, I. Jawed: "Alkali–silica reactivity—a highway perspective" XP002022914, see abstract & 9th International Conference, Alkali–Aggregate Reaction in Concrete, Slough, UK, vol. 1, pp. 471–476.
Database WPI, Section Ch, Week 7623, Derwent Publications Ltd., London, GB; Class F09, An 7642642X, XP002022915 & JP 51 045 698 A (Agency of Ind Sci Tech) Apr. 20, 1976, see abstract.

*Primary Examiner*—Michael Marcheschi
*Attorney, Agent, or Firm*—Alston & Bird LLP

[57] ABSTRACT

Processes for making cement which when used to make concrete can stabilize the concrete against alkali-silica reactivity (ASR) from alkali containing components. The process includes adding lithium containing materials in the front of a cement kiln along with the cement starting materials in an amount sufficient to minimize ASR.

27 Claims, 3 Drawing Sheets

CEMENT AND CONCRETE COMPOSITIONS FOR CONTROLLING ALKALI-SILICA REACTION IN CONCRETE

CROSS-REFERENCE TO RELATED APPLICATIONS

This application is a divisional of application Ser. No. 08/709,552, filed Sep. 6, 1996, U.S. Pat. No. 5,755,876, which is related to commonly owned copending Provisional Application Serial No. 60/003,475, filed Sep. 8, 1995.

FIELD OF THE INVENTION

This invention relates generally to cement compositions and processes for producing the same, and more particularly cement for controlling alkali-silica reaction in concrete which includes the cement as a component.

BACKGROUND OF THE INVENTION

Concrete is a conglomerate of aggregate (such as gravel, sand, and/or crushed stone), water, and hydraulic cement (such as portland cement), as well as other components and/or additives. Concrete is generally fluidic when it is first made, enabling it to be poured or placed into shapes, and then later hardens, and is never again fluidic, in the general sense. Typically, moisture present in normal concrete is basic (that is, has a high pH). Alkali materials can be supplied by the cement, aggregate, additives, and even from the environment in which the hardened concrete exists (such as salts placed on concrete to melt ice).

Silica compounds are typically found in the aggregate components of concrete. Silica which is present in aggregates used to make concrete and mortars is subject to attack and dissolution by hydroxide ions present in basic solutions. Generally, the higher the pH (i.e., the more basic the solution), the faster the attack.

Different forms of silica show varying degrees of susceptibility to this dissolution. If there is sufficient alkali metal ion also present in this solution (such as sodium or potassium ions), the alkali metal ions can react with the dissolved silica and form an alkali-silica gel. Under certain conditions, the resultant alkali-silica gel can absorb water and swell. The swelling can exert pressures greater than the tensile strength of the concrete and thus cause the concrete to swell and crack. This process (hydroxide attack of silica, followed by reaction with alkali such as sodium and potassium) is referred to generally in the art as an "alkali-silica reaction" or "ASR".

ASR has caused the failure of concrete structures, although rarely. Further, ASR can weaken the ability of concrete to withstand other forms of attack. For example, concrete that is cracked due to this process can permit a greater degree of saturation and is therefore much more susceptible to damage as a result of "freeze-thaw" cycles. Similarly, cracks in the surfaces of steel reinforced concrete can compromise the ability of the concrete to keep out salts when subjected to deicers, thus allowing corrosion of the steel it was designed to protect.

ASR is a common chemical process in many concretes around the world. As an indication of its importance to the concrete industry, by 1991 over 1,450 research articles had been published on the subject. See S. Diamond, *Alkali-aggregate reactions in concrete: an annotated bibliography 1939–1991*, Washington, D.C.: National Research Council, Strategic Highway Research Program, SHRP-C/UWP-92-601:470 (1992).

In 1987, Congress authorized a $150 million, five-year research program to be administered by the National Research Council to study and develop improvements in highway construction materials and construction practices. This program was called the Strategic Highway Research Program (SHRP). One of the areas addressed by this program was ASR mitigation. Four recommendations resulted from the SHRP research for preventing ASR in concrete. D. Stark, et al., *Eliminating or minimizing alkali-silica reactivity*, Washington, D.C.:National Research Council, Strategic Highway Research Program, SHRP-C-343 (1993) (the "SHRP report").

One recommendation was the use a low alkali cement, which is defined as a cement with a sodium equivalent of 0.60% or less. The sodium equivalent of a cement is the weight percent of sodium, reported as sodium oxide, plus 0.658 times the weight percent of potassium, reported as potassium oxide. Sodium equivalent ($Na_2O_e$) can be represented generally by the formula $NaO_2 + 0.658 \times K_2O = Na_2O_e$.

While the use of a low alkali cement can have some effectiveness, it is not a guarantee of ASR prevention. Low alkali cement is not always available on a local basis, can have limited availability, and can be more expensive than high alkali cement. Further, if the raw feed for the cement production contains high levels of alkali, then the production of low alkali cement from such feed can generate much greater waste than would otherwise be the case. Generally, "fines" are a waste product of cement production and are normally recirculated into the cement kiln. However, when the raw feed has a high alkali level, the fines must be removed from the process to make a low alkali cement and constitute a waste material. These fines are generally referred in the industry as cement kiln dust.

Still further, using a low alkali cement is no guarantee of ASR control, as the cement is not the sole source of the alkalies in concrete that can contribute to the problem. Alkalies also can be supplied by pozzolans that are either admixed in or part of the blended cement. Alkalies can be supplied by the mix water, admixtures used in the concrete, the aggregate itself, including recycled concrete used as aggregate, and/or deicers applied in snow and ice removal.

Another recommendation set forth by the SHRP report is the use a non-reactive aggregate. This, however, is not always possible. There are limited aggregates with no potential for reactivity, since all silica has some potential for reaction and most aggregates contain significant amounts of silica. Recycled concrete when used as aggregate can also be reactive, particularly if it had already had ASR occurring before it was recycled. There are environmental reasons to use recycled glass as aggregate, but this is very reactive material. Also, transporting aggregates over long distances instead of using locally available materials adds significantly to the cost of concrete production.

Another recommendation is the use of appropriate levels of a suitable pozzolan. A pozzolan is a siliceous material that can combine with lime and water to harden, similar to a cement with just water. Since the hydration of cement produces lime as a byproduct (resulting in its basic nature), pozzolans can work well with cements. The pozzolan may be added as a mineral admixture at the time of concrete production, blended with the cement, or interground with the cement during the final production step of cement. The end result is about the same, as neither the cement nor the pozzolan is substantially changed as a result of the blending.

However, sources of suitable pozzolans are not always available locally, and the supplies are limited. Also, many pozzolans used for this purpose are waste products, and thus are quite variable in composition. An example is fly ash, which is the end result of coal burned for electric generation.

Further, sufficient amounts of the pozzolan must be used, or the protection is short lived, or the ASR can actually be made worse. This is particularly true of pozzolans with significant lime contents (>10%), such as many fly ashes. In a cementitious system, the Ca:Si ratio is very important to its stability with regard to ASR. The higher the Ca:Si ratio, the less capable the system is of tying up alkali present. Thus the protection against ASR is less with high lime fly ashes. A low lime content pozzolan (<10%) will reduce the ratio and give more protection from increased alkalies. However, a high lime content pozzolan will not give this protection, and further, since pozzolans carry their own alkalies into the system, this can easily make the situation worse.

Still another recommendation is the use a lithium-based admixture. Use of lithium was shown to be effective in ASR inhibition in 1951 (see W. J. McCoy and A. G. Caldwell, "New approach to inhibiting alkali-aggregate expansion," J.Amer.Concrete Institute, 22:693–706 (1951)). See also Y. Sakaguchi, et al., "The inhibiting effect of lithium compounds on alkali-silica reaction," Proceedings, 8th international conference, alkali aggregate reaction, Kyoto, Japan: 229–234 (1989), and the SHRP report.

Lithium salts, such as lithium hydroxide monohydrate, have been added to cement at the grinding stage of the cement production. J. Gajda, Development of a cement to inhibit alkali-silica reactivity, Skokie, Ill., Portland Cement Association Research and Development Bulletin RD115T (1996). As with the pozzolan blended cements mentioned above, the net effect is basically the same as if the lithium salt were admixed into the concrete separately at the time the concrete was batched. That is, by adding the lithium salt to the cement at the time of grinding, neither the cement nor the lithium salt is changed during the process. Rather, the lithium salt and cement are merely blended.

One problem associated with adding lithium salts to the concrete mixture or grinding lithium salts with cement is that substantial amounts of the lithium (about 50%, as reported in the SHRP Report) are "locked up" in the hydration products of the early hydration reactions of the cement. A substantial portion of the lithium ions, therefore, is unavailable for use in controlling ASR. This generally happens within the first few days of hydration. Still further, the concentration of hydroxyl ion can increase when lithium salts are admixed into concrete and mortars (see the SHRP Report). This can make the job of the lithium ion that much more difficult, and requires more lithium than would otherwise be the case.

SUMMARY OF THE INVENTION

The present invention provides a process for producing cement which, when used to make concrete or mortar mixtures, can inhibit alkali-silica reactivity from alkali containing components. In the invention, lithium containing materials, including lithium salts, lithium ores, lithium ore concentrates, and preheated or decrepitated lithium ore and concentrates, are heated in a cement kiln with cement starting materials (ores) to form cement clinker. The lithium containing material supplies lithium ions to the cement, which enables the cement thus produced to inhibit alkali-silica reaction in concrete and mortars made with the cement. This is turn can minimize and/or prevent deterioration of concrete from ASR.

The process of the invention also can result in reduced energy requirements necessary to manufacture the cement for a given unit of cement because lithium can act as a flux in cement production. Further, lithium containing materials include siliceous materials which are pozzolanic by nature. In addition, when lithium bearing ores are used as the lithium source, the process of the invention can provide economic advantages as compared to lithium salts (which require extracting and purifying lithium from the ores). Still further, less lithium is required to inhibit ASR in the resultant concrete than purified forms of lithium, because lithium present in lithium bearing ores can be more slowly released into the concrete mixture after much of cement hydration has occurred, in contrast to lithium salts.

The present invention also includes cement produced according to the invention, as well as concrete and mortar which include the cement as a component.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

Figure 1:
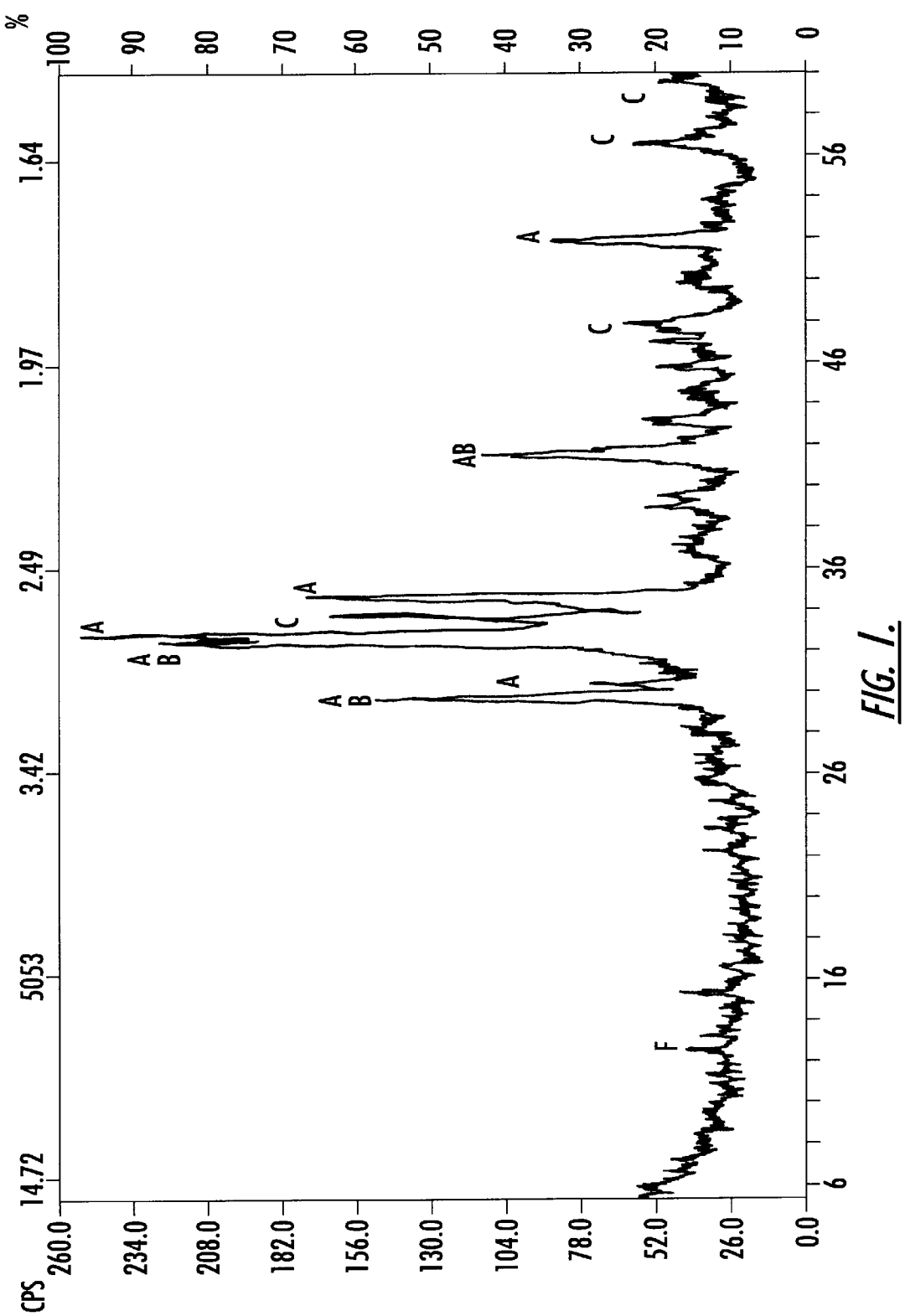
FIG. 1 is an x-ray diffraction pattern of clinker prepared at 1400° C. without lithium.

Cement is manufactured by introducing cement starting materials into a kiln and heating the cement starting materials to extremely high temperatures, typically about 2700° F. Cement starting materials typically include carbonates (limestone or chalk), silica, clays, shales, slates and the like and mixtures thereof. As the skilled artisan will appreciate, other starting materials can also be used. This stage is referred to generally in the art as "clinkering" and the resultant product is referred to as "clinker." The clinker is then cooled and ground, typically with gypsum to control the quick setting properties of the aluminate phases in the cement.

In the present invention, lithium containing materials are added with the cement starting materials in the front end of the cement kiln and heated with the cement starting materials to form clinker. The resultant cement product (or clinker) thus includes lithium and can be an effective mitigator of ASR when added to a concrete or mortar mixture.

As used herein, the term "cement" refers to, but is not limited to, hydraulic and alite cements, such as Portland cement; blended cements, such as Portland cement blended with fly ash, blast-furnace slag, pozzolans, and the like, and mixtures thereof; masonry cement; oil well cement; natural cement; alumina cement; expansive cements, and the like, and mixtures thereof.

Exemplary lithium containing materials include, but are not limited to, refined lithium products such as lithium salts (for example, lithium carbonate, lithium hydroxide monohydrate, lithium nitrate, lithium fluoride, lithium chloride, and the like, and mixtures thereof). Other lithium sources include lithium bearing ores and lithium ore concentrates such as lithium aluminum silicates, such as spodumene ($Li_2O.Al_2O_3.4SiO_2$), petalite ($Li_2O.Al_2O_3.8SiO_2$), eucryptite ($Li_2O.Al_2O_3.2SiO_2$), montrebrasite, lepidolite, lithium-aluminate phosphate ores, such as amblygonite (LiF.AlPO$_4$), lithium-bearing clays, and the like and mixtures thereof. As the skilled artisan will appreciate, the term "lithium bearing ore concentrate" refers to lithium bearing ores which have been treated (beneficiated) to concentrate the lithium bearing mineral. For ease of reference, as used herein the term "lithium bearing ores" refers to both beneficiated and non-beneficiated lithium bearing ores.

The lithium containing material is added to the cement raw feed in the front end of the kiln in an amount effective to mitigate the detrimental effects of ASR in concrete manufactured using the resultant cement product. In the present invention, the lithium containing material is added to the raw feed in an amount sufficient to provide a molar ratio of lithium to sodium equivalent (Na$_2$O$_e$=NaO$_2$+0.658×K$_2$O) in the resultant clinker between about 0.1:1 to about 10:1, preferably about 1:10 to about 5:1, and more preferably about 0.5:1 to about 2:1.

In addition, in the present invention, cement clinkers can be formed at lower kiln temperatures than conventionally used. Typically, clinker is formed in cement kilns at temperatures of about 1420° C. to about 1450° C. In contrast, in the present invention, clinkering can take place at reduced temperatures of about 1300° C. to about 1420° C. This is believed to result from the flux effect of the lithium containing compounds when added to the front end of a cement kiln.

Conventional clinkering processes typically require a large amount of energy to decompose these materials so that they can react to form the basic constituents of cement. Addition of lithium containing materials to the front end of the cement kiln also can result in reduced energy requirements for the clinkering process (about 1% to about 3% less energy required, as compared to the energy required to produce similar units of cement without lithium containing materials). This can, in turn, result in reduced energy costs, fuel costs, and the like. This can have favorable environmental implications since less fuels need to be consumed to manufacture the same amount of cement, with the concurrent reduction in pollutants. This can also increase the life of refractory bricks which line cement kilns per given unit of cement produced. Still further, because less energy is required, this can result in shorter kiln residence times and increased production rates.

To demonstrate that the lithium materials do not interfere with the formation of the clinker minerals at the levels that they would typically be used for ASR inhibition, and that clinker can form at lower temperatures, x-ray diffraction was used to characterize cement clinkers made with and without lithium containing materials. FIG. 1 is an x-ray diffraction pattern of clinker (with gypsum) produced from a raw feed material (or raw meal) burned at 1400° C. for 4 hours without lithium. The oxide concentrations of the raw feed are given below in Example 1. The following peaks are labelled in FIG. 1: Alite (labelled "A" in FIG. 1), Belite ("B"), C$_3$A ("C"), F ("C$_4$AF") and L ("lime"). Alite refers to tricalcium silicate (C$_3$S); Belite refers to dicalcium silicate (C$_2$S); C$_3$A refers to tricalcium aluminate; and C$_4$AF refers to tetracalcium aluminoferrite.

Figure 2:
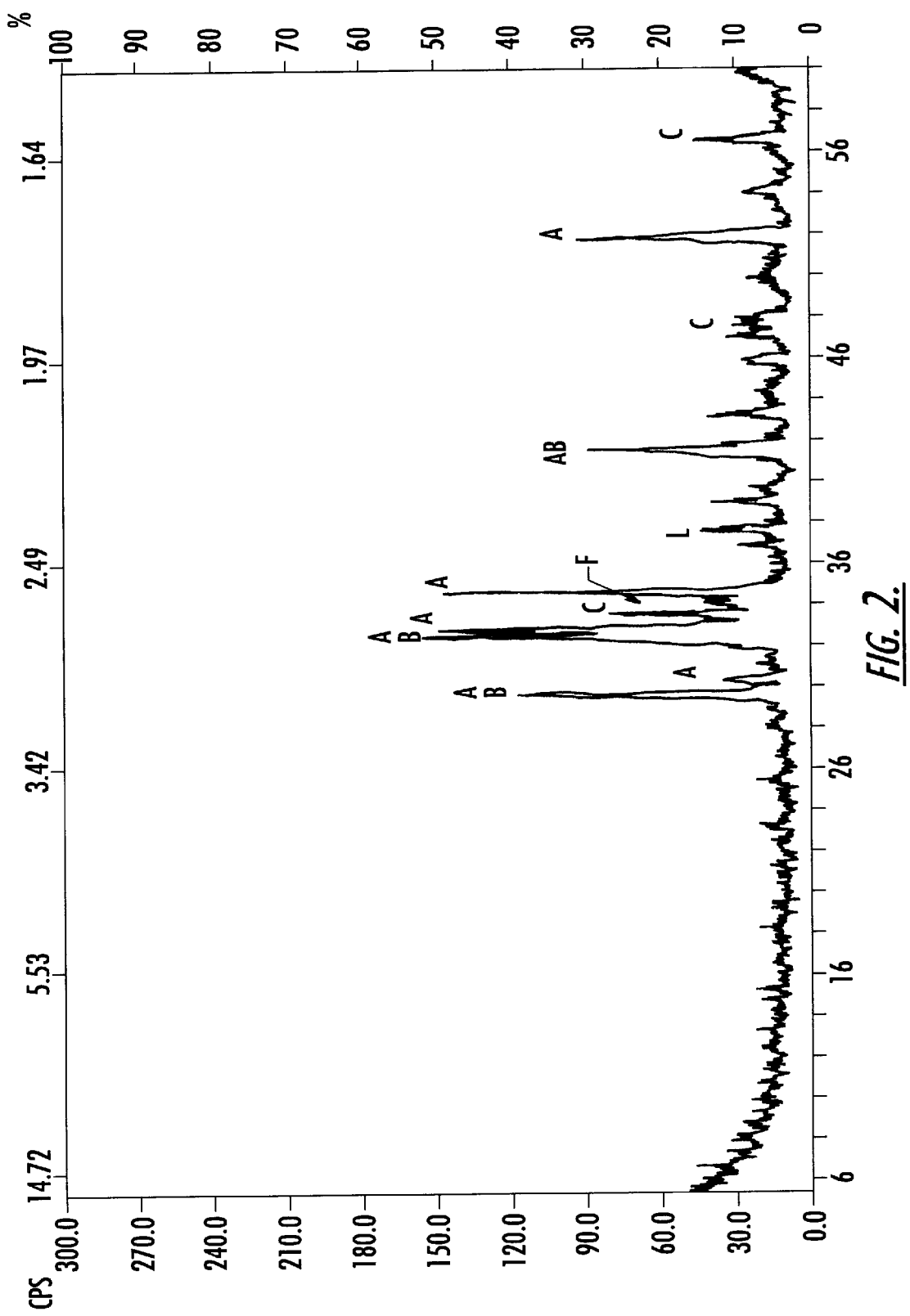
FIG. 2 is an x-ray diffraction pattern of clinker prepared at 1300° C. with lithium.

FIG. 2 is an x-ray diffraction pattern of clinker (with gypsum) produced from the same raw feed material (or raw meal) as in FIG. 1, but which also included spodumene ore concentrate. The spodumene ore was added to the raw feed in an amount sufficient to provide about 0.51% Li$_2$O in the clinker. The raw feed material plus the lithium ore was burned at 1300° C. for 4 hours. The labels A, B, C, F and L have the same meaning as in FIG. 1.

As shown in FIG. 2, when lithium was present, no new peaks were formed, and only subtle differences in intensities were present. The fact that there is no difference in the locations of the main peaks demonstrates that the phases present are essentially the same. Further, FIG. 2 demonstrates that clinker is formed at about 1300° C.

Figure 3:
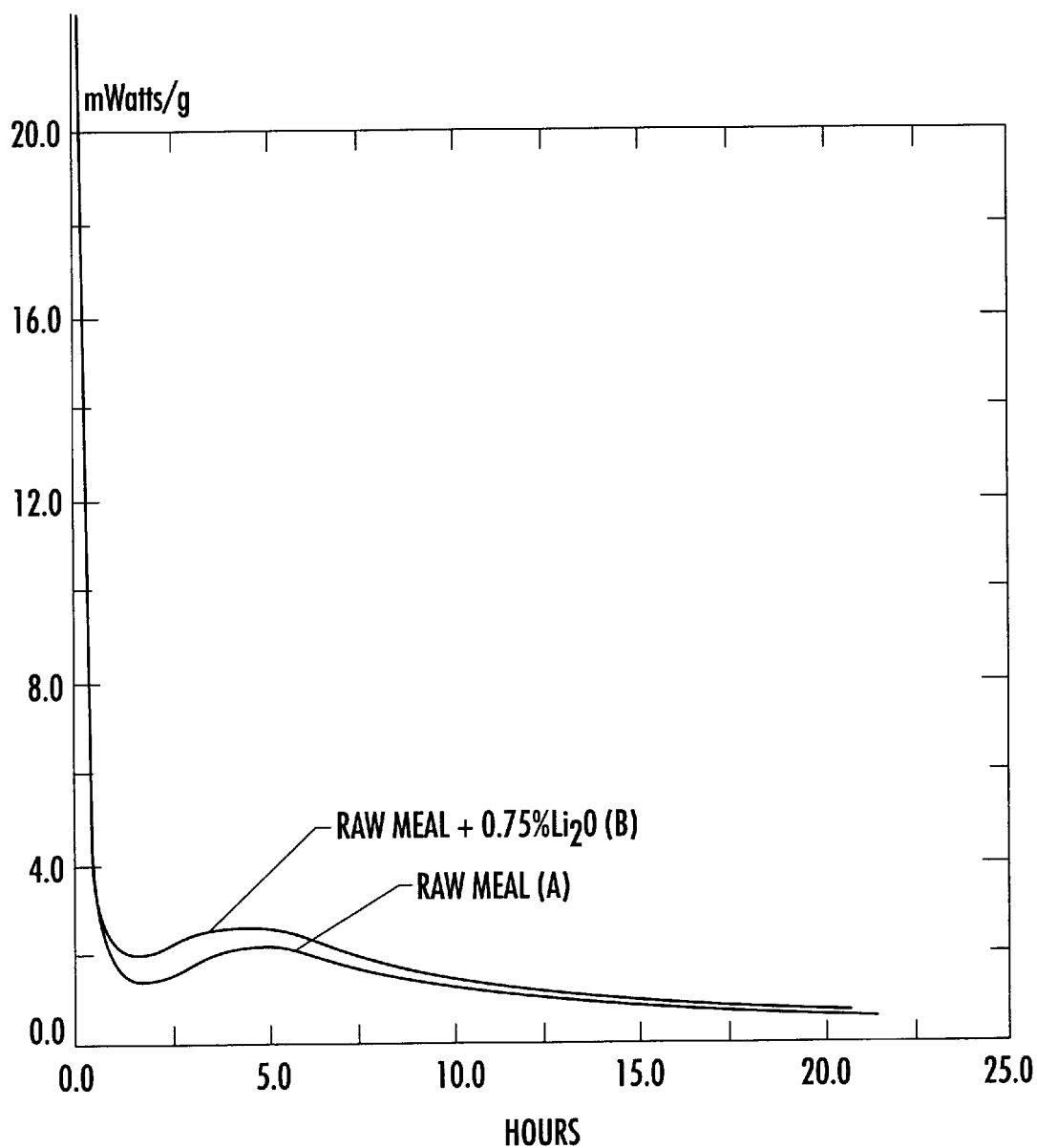
FIG. 3 is a graph illustrating isothermal calorimetry of clinker made with and without lithium at 1400° C.

Hydration calorimetry of ground powders from clinkers made with and without lithium bearing materials also give very similar results. FIG. 3 is a graph illustrating isothermal calorimetry properties at 38° C. of clinker made with and without lithium. "A" represents the hydration properties of clinker made from raw feed of the same composition as described above with regard to FIG. 1 (without lithium); "B" represents the hydration properties of clinker made from raw feed of the same composition as described above with regard to FIG. 2, with lithium, except that the lithium carbonate was added in an amount sufficient to provide 0.75% Li$_2$O in the clinker. Both clinkers were produced from materials burned at 1400° C. for four hours.

As illustrated in FIG. 3, there is also some increased and earlier hydration with added lithium. This demonstrates greater hydraulic activity of the clinker prepared with lithium containing materials. Because of the greater hydraulic activity of the cement made with lithium in accordance with the present invention, the resultant cement does not need to be ground as fine as would otherwise be the case for equivalent rate of reaction, resulting in a further reduction in production costs.

The present invention is also useful for making high alkali cement which also is capable of stabilizing concrete against alkali-silica reactivity. High alkali cement is generally defined as cement having a sodium equivalent (as defined above) of about 0.60% or greater. However, some standards require that low alkali cement have a sodium equivalent of about 0.40% or less. In such circumstances, high alkali cement also can be defined as cement having a sodium equivalent of about 0.40% or greater.

As discussed above, if the raw feed for the cement production contains high levels of alkali, then the production of low alkali cement (less than about 0.60% sodium equivalent) from such feed can generate much greater waste than would otherwise be the case. Generally, cement production generates "fines" or cement kiln dust. Fines are a waste product of cement production and are normally recirculated into the cement kiln. However, when the raw feed has a high alkali level, the fines must be removed from the process to form low alkali cement, and thus constitute a waste material.

Thus, prior techniques require the removal of fines from the cement making process when using high alkali cement starting materials to provide low alkali cement. In this aspect of the invention, lithium containing materials are added in the front end of the kiln along with high alkali starting materials. In contrast to prior techniques, because of the ASR mitigating properties imparted to the cement by the lithium containing materials, the fines do not have to be removed. Rather, the fines can be recirculated in the kiln. Although the resultant cement can be a high alkali cement, the use of the lithium containing materials in the front end of the kiln results in a high alkali cement with ASR mitigating properties.

This can provide process advantages, i.e., eliminate the need for removing fines. This also can have favorable environmental implications, i.e., a reduction in fines as a hazardous waste which must be properly disposed of.

The present invention also provides lithium containing cements useful for making concrete and mortar resistant to alkali-silica reactivity from alkali containing components. The concrete compositions generally include cement, aggregate, and water. The cement is present in the fluid concrete mixture in an amount between about 5% to about 20% by weight based on the total weight of the concrete mixture.

Aggregates can include, but are not limited to natural and crushed quarried aggregate, sand, recycled concrete aggregate, glass, and the like, as well as mixtures thereof. Aggregate is present in the fluid concrete mixture in an amount between about 75% to about 95% by weight, based on the total weight of the concrete mixture.

The fluid concrete mixture also includes water, in an amount ranging from about 2% to about 10% by weight based on the total weight of the mixture. The fluid concrete mixture also can include other materials as known in the art for imparting various properties to concrete, including, but not limited to, air-entraining admixtures, water reducing admixtures, accelerating admixtures, pozzolans, such as, but not limited to, fly ash, metakaolin, and silica fume, and the like. These agents can be present in conventional amounts.

Although reference has been made to the components of concrete, it will be appreciated that the present invention also includes mortar compositions, which generally are similar in composition to concrete, except that mortar is typically made with sand as the sole aggregate, in contrast to concrete which includes larger aggregates. Sand in this sense is aggregate of ⅜" and smaller diameter.

The present invention will be further illustrated by the following non-limiting examples.

EXAMPLE 1

Making an ASR Resistant Cement with Spodumene Ore Concentrate

In this example, the target is a $Li_2O$ content of 0.51% by weight in the clinker, which would be sufficient for a high degree of ASR.

The constituents of a mixture of cement starting materials (60.5% raw feed, 30.9% calcium carbonate, 0.2% silica), and 8.5% spodumene ore concentrate are given below, along with the clinker composition that would result from the use this mixture:

| Oxide | Raw Feed | Ore Concentrate | Clinker |
|---|---|---|---|
| $SiO_2$ | 21.74 | 59.5 | 21.25 |
| $Al_2O_3$ | 5.75 | 24.1 | 6.39 |
| CaO | 66.33 | 2.30 | 66.66 |
| $Fe_2O_3$ | 3.48 | 2.30 | 2.66 |
| MgO | 2.96 | 0.70 | 2.14 |
| $Na_2Oeq$ | 1.20 | 1.70 | 1.01 |
| $Li_2O$ | 0 | 5.20 | 0.51 |

FIG. 2 is an x-ray diffraction pattern of the resultant clinker of this example.

EXAMPLE 2

Making an ASR Resistant Cement with Lithium Carbonate

In this example, 0.1% to 10% $Li_2CO_3$ by weight of the combined ingredients was added to a raw feed as described above in Example 1 into the kiln.

EXAMPLE 3

Making an ASR Resistant Cement with Lithium Hydroxide

In this example, 0.1% to 10% $LiOH.H_2O$ by weight of the combined ingredients was added to a raw feed as described above in Example 1 into the kiln.

EXAMPLE 4

Making an ASR Resistant Cement with Decrepitated Spodumene Ore Concentrate

In this example, the target is a $Li_2O$ content of 0.42% by weight in the clinker, which would be sufficient for moderately high degree of ASR.

The constituents of a mixture of cement starting materials (64.7% raw feed, 38.2% calcium carbonate, 0.2% silica), and 7.0% decrepitated spodumene ore concentrate are given below, along with the clinker composition that would result:

| Oxide | Raw Feed | Ore Concentrate | Clinker |
|---|---|---|---|
| $SiO_2$ | 21.74 | 59.5 | 21.00 |
| $Al_2O_3$ | 5.75 | 24.1 | 6.17 |
| CaO | 66.33 | 2.30 | 67.14 |
| $Fe_2O_3$ | 3.48 | 2.30 | 2.75 |
| MgO | 2.96 | 0.70 | 2.24 |
| $Na_2Oeq$ | 0.8 | 1.70 | 0.73 |
| $Li_2O$ | 0 | 5.20 | 0.42 |

The foregoing examples are illustrative of the present invention and are not to be construed as limiting thereof.

That which is claimed is:

1. A cement which stabilizes concrete against alkali-silica reactivity (ASR) from alkali containing components produced by a process which comprises:

heating a mixture of cement starting materials and lithium containing materials for a time and temperature sufficient to chemically react the cement starting materials and incorporate the lithium containing materials, thus forming a cement clinker, wherein the lithium containing materials are present in an amount sufficient to minimize ASR in the concrete.

2. A cement which stabilizes concrete against alkali-silica reactivity (ASR) from alkali containing components produced by a process which comprises:

heating a mixture of cement starting materials and lithium bearing ores for a time and temperature sufficient to chemically react the cement starting materials and incorporate the lithium bearing ores, thus forming a cement clinker, wherein the lithium bearing ores are present in an amount sufficient to minimize ASR in the concrete.

3. A cement which stabilizes concrete against alkali-silica reactivity (ASR) from alkali containing components produced by a process which comprises:

heating a mixture of cement starting materials and lithium salts for a time and temperature sufficient to chemically react the cement starting materials and incorporate the lithium salts, thus forming a cement clinker, wherein the lithium salts are present in an amount sufficient to minimize ASR in the concrete.

4. A concrete stabilized against alkali-silica reactivity (ASR) from alkali containing components produced by a process which comprises:

mixing together cement, aggregate and water, said cement being produced by heating a mixture of cement starting materials and lithium containing materials for a time and temperature sufficient to chemically react the cement starting materials and incorporate the lithium containing materials, wherein the lithium containing materials are present in an amount sufficient to minimize ASR in the concrete.

5. A concrete stabilized against alkali-silica reactivity (ASR) from alkali containing components produced by a process which comprises:

mixing together cement, aggregate and water, said cement being produced by heating a mixture of cement starting materials and lithium bearing ores for a time and temperature sufficient to chemically react the cement starting materials and incorporate the lithium bearing ores, wherein the lithium bearing ores are present in an amount sufficient to minimize ASR in the concrete.

6. A concrete stabilized against alkali-silica reactivity (ASR) from alkali containing components produced by a process which comprises:

mixing together cement, aggregate and water, said cement produced by heating a mixture of cement starting materials and lithium salts for a time and temperature sufficient to chemically react the cement starting materials and incorporate the lithium salts, wherein the lithium salts are present in an amount sufficient to minimize ASR in the concrete.

7. Cement comprising a plurality of crystalline phases, at least some of said crystalline phases comprising lithium as a component thereof.

8. Concrete comprising cement, said cement comprising a plurality of crystalline phases, at least some of said crystalline phases comprising lithium as a component thereof.

9. The cement of claim 1, wherein said lithium containing material comprises lithium ore.

10. The cement of claim 9, wherein said lithium ore is selected from the group consisting of spodumene, petalite, eucryptite, amblygonite, montrebrasite, lepidolite, lithium-bearing clays, and mixtures thereof.

11. The cement of claim 10, wherein said lithium ore is decrepitated lithium ore.

12. The cement of claim 1, wherein said lithium containing material comprises lithium salt.

13. The cement of claim 12, wherein said lithium salt is selected from the group consisting of lithium carbonate, lithium hydroxide monohydrate, lithium nitrate, lithium fluoride, lithium chloride, and mixtures thereof.

14. The cement of claim 1, wherein said lithium containing material is present in said cement starting materials in an amount sufficient to provide a molar ratio of lithium to sodium equivalent in the resultant cement clinker between about 0.1:1 to about 10:1.

15. The cement of claim 14, wherein said lithium containing material is present in said cement starting materials in an amount sufficient to provide a molar ratio of lithium to sodium equivalent in the resultant cement clinker between about 1:10 to about 5:1.

16. The cement of claim 15, wherein said lithium containing material is present in said cement starting materials in an amount sufficient to provide a molar ratio of lithium to sodium equivalent in the resultant cement clinker between about 0.5:1 to about 2:1.

17. The concrete of claim 4, wherein said lithium containing material comprises lithium ore.

18. The concrete of claim 17, wherein said lithium ore is selected from the group consisting of spodumene, petalite, eucryptite, amblygonite, montrebrasite, lepidolite, lithium-bearing clays, and mixtures thereof.

19. The concrete of claim 18, wherein said lithium ore is decrepitated lithium bearing ore.

20. The concrete of claim 4, wherein said lithium containing material comprises lithium salt.

21. The concrete of claim 20, wherein said lithium salt is selected from the group consisting of lithium carbonate, lithium hydroxide monohydrate, lithium nitrate, lithium fluoride, lithium chloride, and mixtures thereof.

22. The concrete of claim 4, wherein said lithium containing material is present in said cement starting materials in an amount sufficient to provide a molar ratio of lithium to sodium equivalent in the resultant cement clinker between about 0.1:1 to about 10:1.

23. The concrete of claim 22, wherein said lithium containing material is present in said cement starting materials in an amount sufficient to provide a molar ratio of lithium to sodium equivalent in the resultant cement clinker between about 1:10 to about 5:1.

24. The concrete of claim 23, wherein said lithium containing material is present in said cement starting materials in an amount sufficient to provide a molar ratio of lithium to sodium equivalent in the resultant cement clinker between about 0.5:1 to about 2:1.

25. A cement starting material comprising a lithium containing material and at least one material selected from the group consisting of carbonates, silica, clays, shales, slates, and mixtures thereof, wherein the lithium containing material is present in an amount sufficient to minimize ASR in concrete.

26. The cement starting material of claim 25, wherein said lithium containing material is selected from the group consisting of lithium bearing ores and lithium salts.

27. The cement of claim 1, wherein said cement exhibits increased and earlier hydration in comparison to cement clinker of the same composition except without said lithium containing material.

* * * * *

UNITED STATES PATENT AND TRADEMARK OFFICE
CERTIFICATE OF CORRECTION

PATENT NO. : 6,022,408

DATED : February 8, 2000

INVENTOR(S) : Stokes et al.

It is certified that error appears in the above-identified patent and that said Letters Patent is hereby corrected as shown below:

Column 9, line 14, after "cement" insert --being--.

Signed and Sealed this

Twenty-sixth Day of December, 2000

*Attest:*

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 6,022,408
DATED : February 8, 2000
INVENTOR(S) : Stokes, et. al.

It is certified that error appears in the above-identified patent and that said Letters Patent is hereby corrected as shown below:

Title page, item [56] References Cited, U.S. PATENT DOCUMENTS, line 2, "4,391,314 7/1983" should read -- 4,931,314    6/1990--.

Column 9, line 14, after "cement" insert --being--. (2$^{nd}$ occurr.)

This certificate supersedes Certificate of Correction issued December 26, 2000.

Signed and Sealed this

Sixth Day of March, 2001

*Attest:*

NICHOLAS P. GODICI

*Attesting Officer*    *Acting Director of the United States Patent and Trademark Office*